United States Patent
Qi et al.

(10) Patent No.: US 10,493,716 B2
(45) Date of Patent: Dec. 3, 2019

(54) HEAT STAKE AND METHOD OF ELIMINATING HEAT STAKE SINK MARKS IN A PLASTIC PART

(71) Applicant: FORD GLOBAL TECHNOLOGIES, LLC, Dearborn, MI (US)

(72) Inventors: Liying Qi, Troy, MI (US); Jeffrey Peter Webb, Iron Mountain, MI (US); Frank Qiukui Liu, Canton, MI (US); Linh Doan, Bellevue, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/287,901

(22) Filed: Oct. 7, 2016

(65) Prior Publication Data

US 2018/0099446 A1    Apr. 12, 2018

(51) Int. Cl.
| | |
|---|---|
| *B32B 1/02* | (2006.01) |
| *B32B 1/08* | (2006.01) |
| *B32B 3/02* | (2006.01) |
| *B29C 48/09* | (2019.01) |
| *B29C 65/60* | (2006.01) |
| *B29C 45/44* | (2006.01) |
| *B29C 45/26* | (2006.01) |
| *B29L 22/00* | (2006.01) |
| *B29L 31/18* | (2006.01) |

(52) U.S. Cl.
CPC ............... *B32B 1/02* (2013.01); *B29C 45/44* (2013.01); *B29C 45/4407* (2013.01); *B29C 48/09* (2019.02); *B29C 65/606* (2013.01); *B29C 65/607* (2013.01); *B32B 1/08* (2013.01); *B32B 3/02* (2013.01); *B29C 45/2628* (2013.01); *B29L 2022/00* (2013.01); *B29L 2031/18* (2013.01)

(58) Field of Classification Search
CPC .... B32B 1/02; B32B 1/08; B32B 3/02; B32B 3/30; B29C 47/0023; B29C 65/606; B29C 65/607
See application file for complete search history.

(56) References Cited

U.S. PATENT DOCUMENTS

| | | | |
|---|---|---|---|
| 1,475,827 A | 11/1923 | Hogarty et al. | |
| 2,065,333 A | 12/1936 | Kirley et al. | |
| 3,638,259 A | 2/1972 | Eibes et al. | |
| 7,070,378 B2* | 7/2006 | Grabowski | B29C 65/607 264/249 |
| 2007/0074592 A1* | 4/2007 | Santos | G01D 11/30 73/866.5 |

FOREIGN PATENT DOCUMENTS

CN      201325149 Y    10/2009

OTHER PUBLICATIONS

English Machine Translation of CN201325149Y.

* cited by examiner

*Primary Examiner* — Walter Aughenbaugh
(74) *Attorney, Agent, or Firm* — Vichit Chea; King & Schickli, LLC (57) ABSTRACT

A heat stake for a plastic part includes a body having a proximal end, a flared section and a distal end. The proximal end has a first cross-sectional area $A_1$ and the flared section has a second cross-sectional area $A_2$ where $A_1<A_2$. The distal end has a dual taper. That plastic part incorporating the heat stake is also disclosed.

15 Claims, 8 Drawing Sheets

HEAT STAKE AND METHOD OF ELIMINATING HEAT STAKE SINK MARKS IN A PLASTIC PART

TECHNICAL FIELD

This document relates generally to the fastener field and, more particularly, to a heat stake for a plastic part that eliminate heat stake sink marks in that plastic part.

BACKGROUND

It is well known in the art to utilize a heat stake in order to fasten a plastic part in position.

Figure 1:
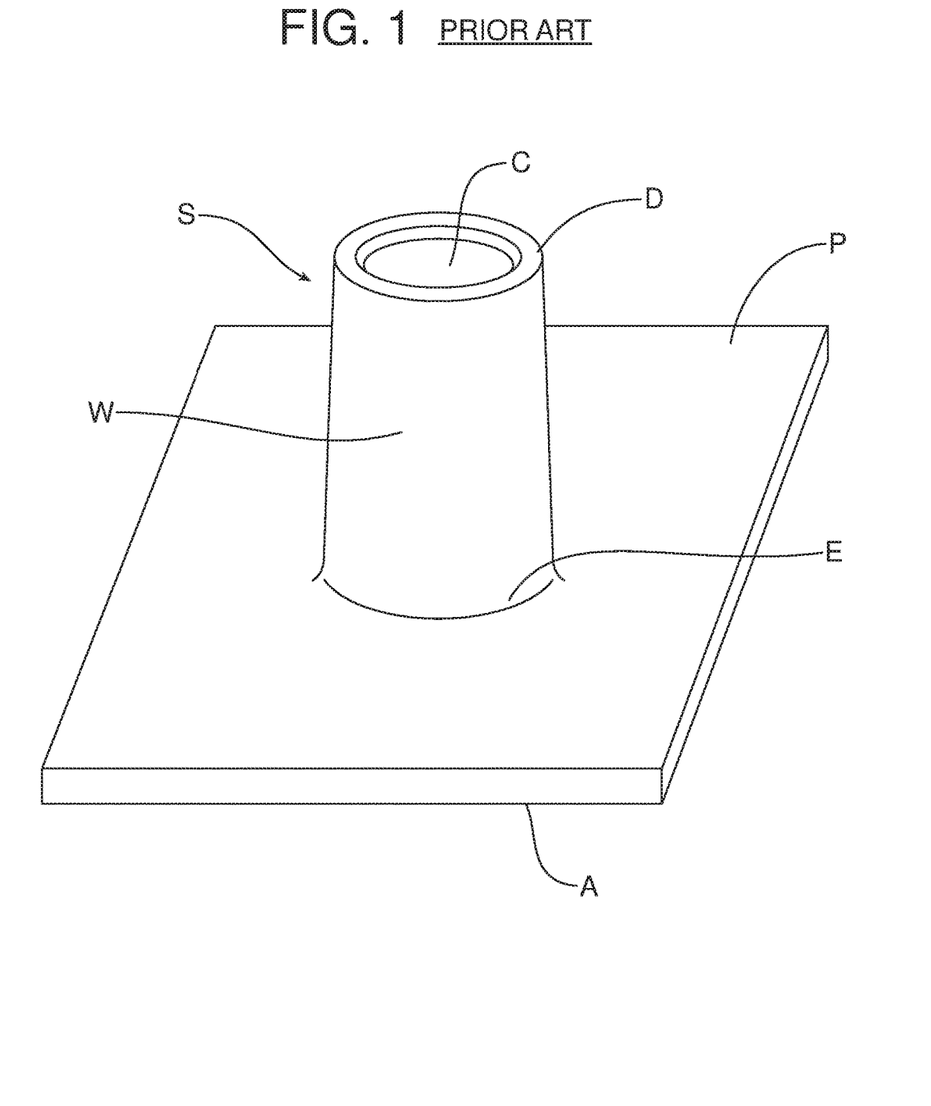
FIG. 1 is a perspective view of a plastic part incorporating a prior art heat stake including a cylindrical wall with a draft that tapers from the proximal end of the heat stake attached to the body of the plastic part toward the distal end of the heat stake in order to allow removal of the plastic part from an injection tool or mold.
Figure 2:
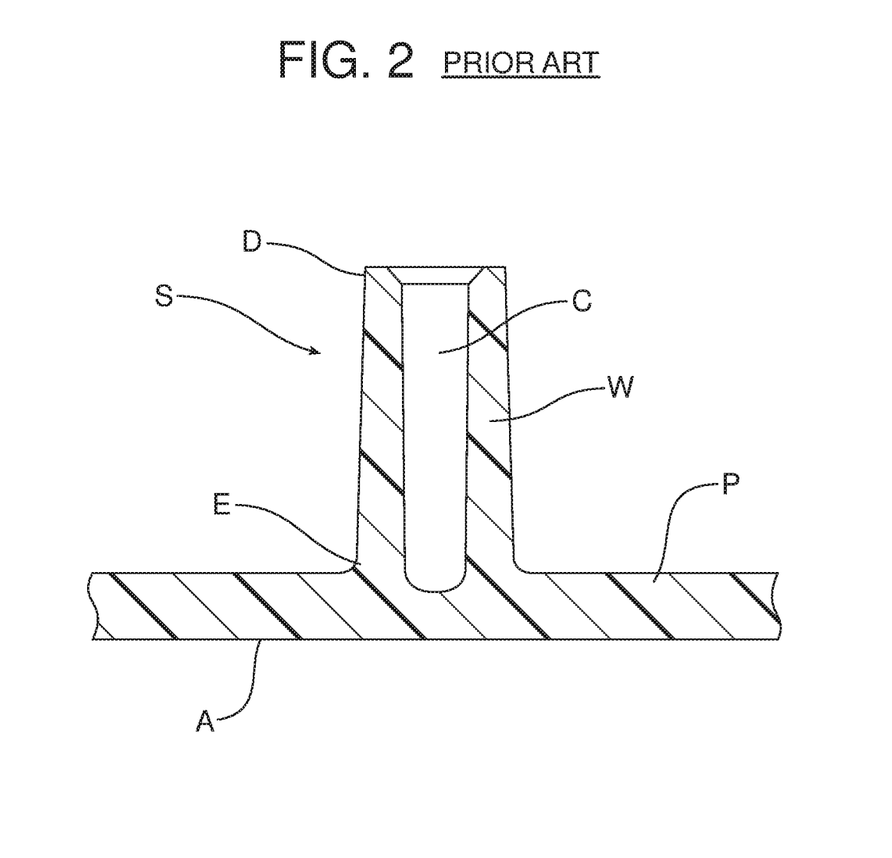
FIG. 2 is a cross-sectional view of the prior art heat stake illustrated in FIG. 1.

As illustrated in FIGS. 1 and 2, a typical heat stake S includes a tapered cylindrical sidewall W having a hollow core C. More specifically, the taper is toward the distal end D of the heat stake S and results from a design draft to allow the plastic part P to be removed from an injection molding tool. As a result, the wall W of the heat stake S includes a greater cross-sectional area and perimeter at the proximal end E adjacent the plastic part P than at the distal end D. The increased cross-sectional area of the heat stake S at the proximal end E where the heat stake S is joined with the plastic part P has a tendency to promote sink marks in the surface A of the plastic part P. This increases material usage, product waste and cost.

This document relates to a new and improved heat stake for a plastic part that effectively reduces the cross-sectional area of the heat stake at the proximal end where the heat stake is joined with the plastic part thereby avoiding sink marks in the A surface of the plastic part even when the plastic part includes relatively thin cross sections. Advantageously, this is achieved without adding tooling actions in the injection mold tools to form the associated undercut features.

SUMMARY

In accordance with the purposes and benefits described herein, a heat stake is provided for a plastic part. That heat stake comprises a body having a proximal end, a flared section and a distal end. The proximal end has a first cross-sectional area $A_1$ while the flared section has a second cross-sectional area $A_2$ where $A_1<A_2$. The distal end includes a dual taper effectively providing more material to melt during sonic-staking without increasing hole size. Accordingly, a more robust connection may be provided.

The body of the heat stake may also define a first slot extending between the proximal end and the distal end. The body of the heat stake may also define a second slot extending between the proximal end and the distal end. The body of the heat stake may also define a third slot extending between the proximal end and the distal end. Further, the body may include a hollow core.

The first slot, the second slot and the third slot may be radially arrayed around the body. Thus, the body may include a first section extending between the first slot and the second slot, a second section extending between the second slot and the third slot and a third section extending between the third slot and the first slot.

In accordance with an additional aspect, a plastic part is provided including the heat stake.

The heat stake for a plastic part may comprise a body having a proximal end, a flared section and a distal end wherein the proximal end has a first perimeter $P_1$ and the flared section has a second perimeter $P_2$ where $P_1<P_2$. The distal end includes a dual taper comprising an inner lead-in and an outer lead-in. The body defines a first slot extending between the proximal end and the distal end. The body may also define a second slot extending between the proximal end and the distal end. Further, the body may define a third slot extending between the proximal end and the distal end. Further, the body may include a hollow core.

The first slot, the second slot and the third slot may all be radially arrayed around the body. Thus, the body may include a first section extending between the first slot and the second slot, a second section extending between the second slot and the third slot and a third section extending between the third slot and the first slot.

In accordance with still another aspect, a method is provided of eliminating heat stake sink marks in a plastic part. That method comprises the steps of (a) forming a body of the heat stake with a first cross-sectional area $A_1$ at a proximal end and a second cross-sectional area $A_2$ at a flared section where $A_1<A_2$ and (b) forming at least one longitudinal slot in the body of the heat stake extending from the proximal end to the distal end.

In the following description, there are shown and described several preferred embodiments of the heat stake as well as a plastic part incorporating the heat stake. As it should be realized, the heat stake and the plastic part are capable of other, different embodiments and their several details are capable of modification in various, obvious aspects all without departing from the heat stake and plastic part as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the heat stake and together with the description serve to explain certain principles thereof. In the drawing figures.

Reference will now be made in detail to the present preferred embodiments of the heat stake and a plastic part incorporating the heat stake, examples of which are illustrated in the accompanying drawing figures.

DETAILED DESCRIPTION

Figure 3:
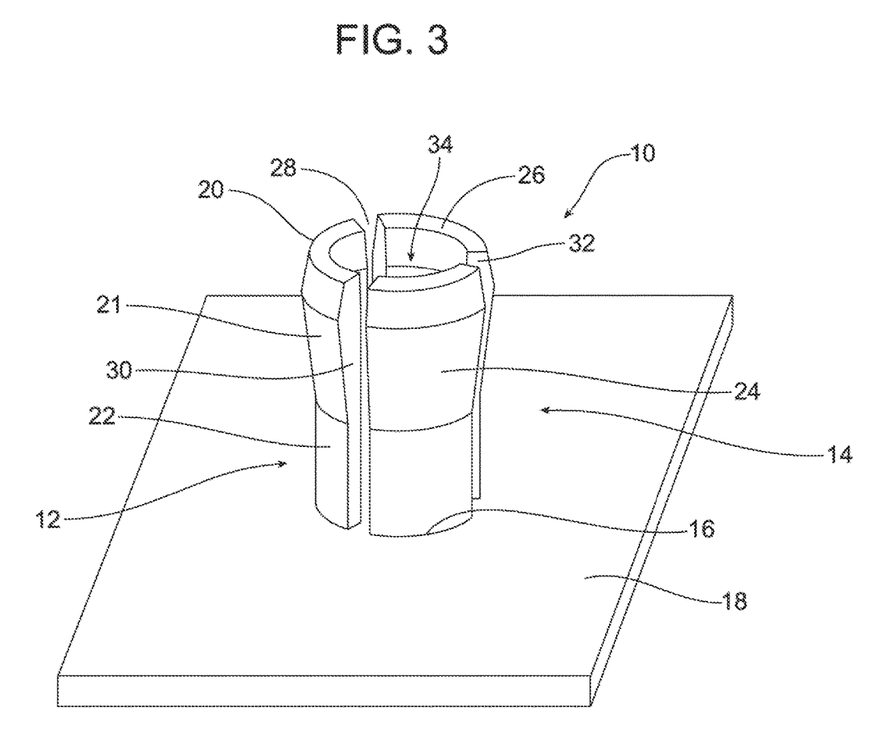
FIG. 3 is a perspective view of a plastic part including the new and improved heat stake.
Figure 4:
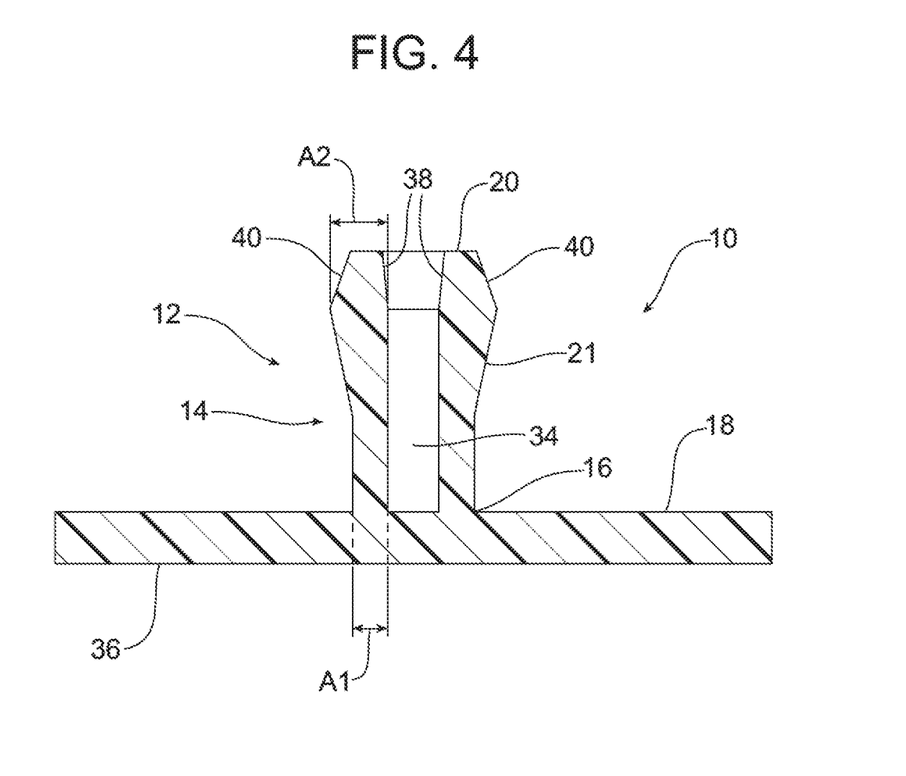
FIG. 4 is a cross-sectional view through the new and improved heat stake illustrated in FIG. 3.

Reference is now made to FIGS. 3 and 4 illustrating a plastic part 10 incorporating the new and improved heat stake 12. As illustrated, the heat stake 12 includes a body 14 having a proximal end 16 joined to the B surface 18 of the plastic part 10 and a distal end 20 opposite the proximal end and a flared section 21 therebetween. The proximal end 16 has a first cross-sectional area $A_1$ and the flared section 21 has a second cross-sectional area $A_2$ where $A_1<A_2$. In addition, the proximal end 16 has a first perimeter $P_1$ and the flared section 21 has a second perimeter $P_2$ where $P_1<P_2$.

In the illustrated embodiment, the body 14 comprises a first section 22, a second section 24 and a third section 26. The body 14 also defines a first slot 28, a second slot 30 and a third slot 32. The first slot 28, the second slot 30 and the third slot 32 all extend between the proximal end 16 and the distal end 20.

More specifically, the first section 22 extends between the first slot 28 and the second slot 30. The second section 24 extends between the second slot 30 and the third slot 32. The third section 26 extends between the third slot 32 and the first slot 28. The body 14 incorporates a hollow core 34 in communication with the first slot 28, the second slot 30 and the third slot 32.

Further, in the illustrated embodiment, the increase in the second cross-sectional area $A_2$ at the flared section 21 of the body 14 is provided by an increase in the outer diameter of the body 14 at the distal end (i.e. an outward taper). As a result, the body 14 includes a greater amount of material at the flared section 21 for the purposes of staking the plastic part 10 to another work piece. In contrast, the body 14 includes less material at the proximal end 16 to resist the formation of sink marks during the molding process in the A surface 36 of the plastic part 10.

The dual tapered distal end 20 includes an inner lead-in 38 and an outer lead-in 40. As a result, still more material is provided for sonic welding. This additional material is provided without further increasing the outer diameter of the body 14. Thus, it is not necessary to increase the size of the hole in which the heat stake 10 is received. As a consequence, more material is provided for melting around a hole of equal size. Thus, a stronger or more robust connection is provided with improved clamp load.

Figure 5A:
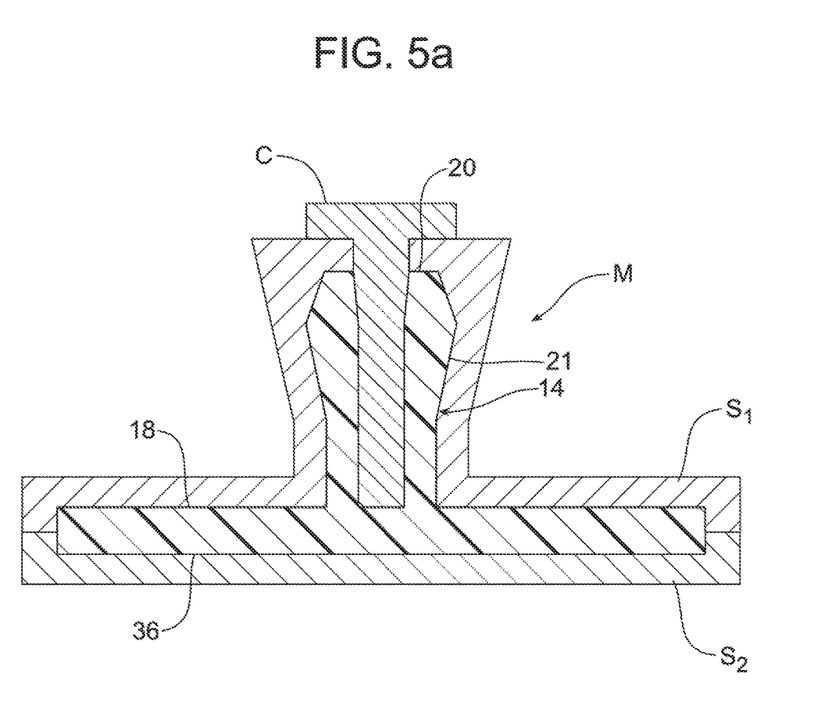
FIGS. 5a-5d are a series of schematic illustrations showing how the new and improved heat stake with a greater cross-sectional area at the distal end thereof bends or folds inward to allow for removal or ejection from the injection tool or mold.
Figure 5B:
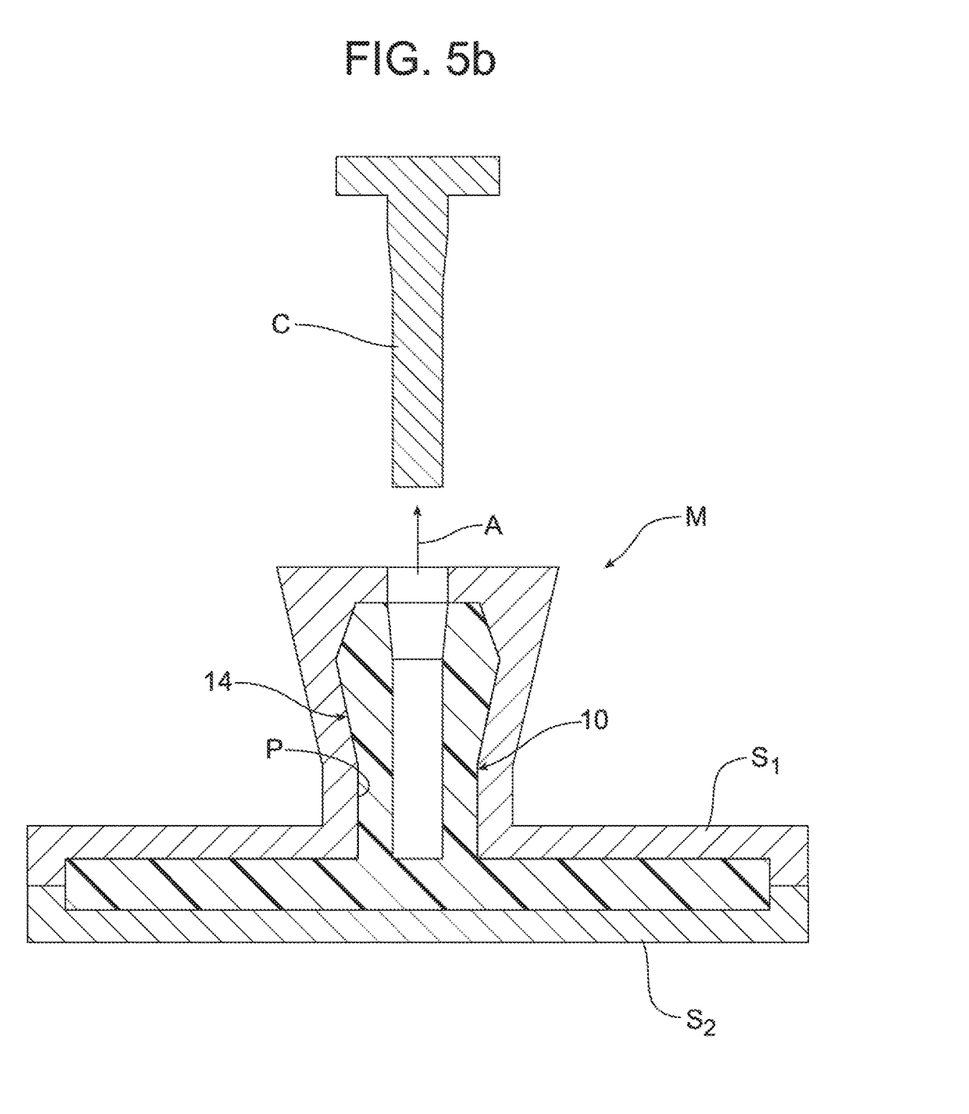
Figure 5C:
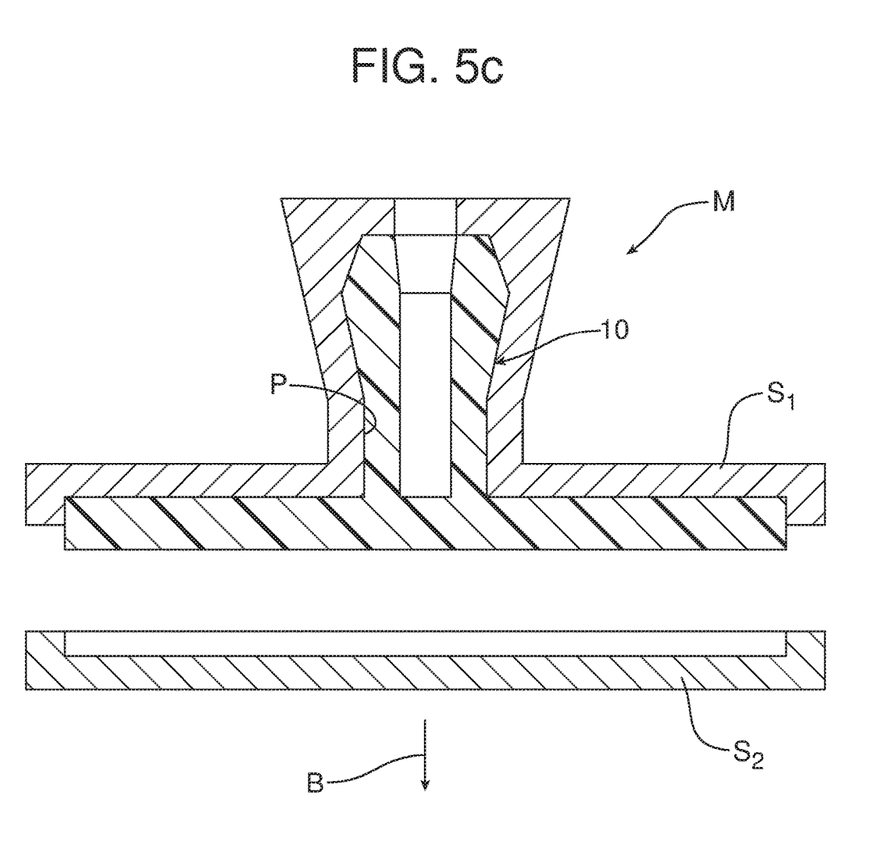
Figure 5D:
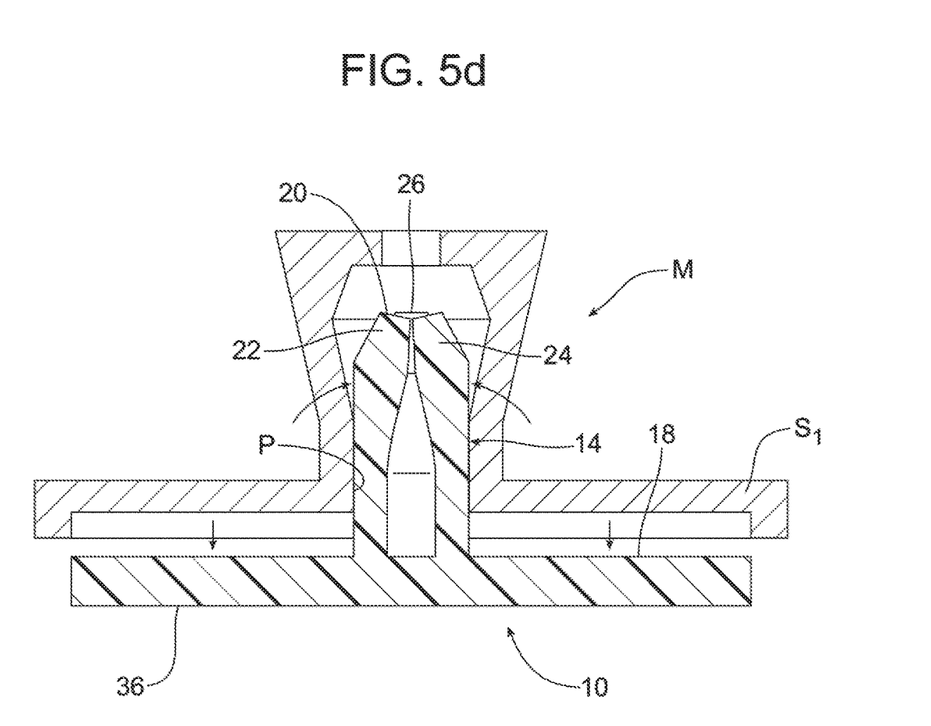

Reference is now made to FIGS. 5a-5d illustrating how the plastic part 10 incorporating a heat stake 12 may be removed from the injection tool following molding. FIG. 5a illustrates the plastic part 10 in the injection mold or tool M immediately following injection of the plastic material into the mold tool. Following curing, the core mold section C is withdrawn from the first mold section $S_1$ (note action arrow A). This opens the hollow core 34 of the heat stake 12. Next, the mold tool M is opened by displacing the second mold section $S_2$ away from the A surface 36 of the plastic part 10. See FIG. 5c. The plastic part is then ejected from the first mold section $S_1$ (see action arrow B). As this is done the first section 22, second section 24 and third section 26 of the body 14 bend inward (note action arrow D) into the core 34 or space vacated by the core mold section C allowing the necessary clearance for the larger distal end 20 of the heat stake 12 to move through the narrow mold passage P that forms the smaller diameter portion of the body 14 of the heat stake. Here it should be appreciated the inward bending of the first, second and third sections 22, 24, 26 of the body 14 is accommodated by the first, second and third slots 28, 30, 32. This allows the heat stake 12 to be formed with a larger outer diameter at the distal end 20 and an increase in material for the staking process while also minimizing the amount of material in the body 14 at the proximal end 16 so as to prevent the formation of sink marks in the A surface 36 of the plastic part 10.

Consistent with the above description, a method of eliminating heat stake sink marks in a plastic part 10 includes the step of forming a body 14 of a heat stake 10 with a first cross-sectional area $A_1$ at a proximal end 16 and a second cross-sectional area $A_2$ at a flared section 21 where $A_1<A_2$. Further, the method includes forming at least one longitudinal slot 28, 30, 32 in the body 14 of the heat stake 10 extending from the proximal end 16 to the distal end 20.

The foregoing has been presented for purposes of illustration and description. It is not intended to be exhaustive or to limit the embodiments to the precise form disclosed. Obvious modifications and variations are possible in light of the above teachings. For example, the heat stake 10 illustrated in drawing FIGS. 3-5d includes a body 14 having three sections 22, 24, 26 and three slots 28, 30, 32. It should be appreciated that the body 14 may include a different number of slots and sections. Further, in the illustrated embodiment the sections 22, 24, 26 all extend through arcs of the same dimension. It should be appreciated that the sections 22, 24, 26 and even the slots 28, 30, 32 may all extend through arcs of different dimension. Further, it should be appreciated that the illustrated heat stake 10 has a generally cylindrically shaped body but the body could include other cross-sectional shapes. All such modifications and variations are within the scope of the appended claims when interpreted in accordance with the breadth to which they are fairly, legally and equitably entitled.

What is claimed:

1. A heat stake for a plastic part, comprising:
   a body having (a) a proximal end, (b) a distal end including a dual taper having an inner lead-in and an outer lead-in, and (c) a flared section between said proximal end and said distal end, said proximal end having a first cross-sectional area $A_1$ and said flared section having a second cross-sectional area $A_2$ where $A_1<A_2$.

2. The heat stake of claim 1, wherein said body defines a first slot extending between said proximal end and said distal end.

3. The heat stake of claim 2, wherein said body defines a second slot extending between said proximal end and said distal end.

4. The heat stake of claim 3, wherein said body defines a third slot extending between said proximal end and said distal end.

5. The heat stake of claim 4, wherein said body includes a hollow core.

6. The heat stake of claim 5, wherein said first slot, said second slot and said third slot are radially arrayed around said body.

7. The heat stake of claim 6, wherein said body includes a first section extending between said first slot and said second slot, a second section extending between said second slot and said third slot and a third section extending between said third slot and said first slot.

8. A plastic part including the heat stake of claim 1.

9. A heat stake for a plastic part, comprising:
   a body having a proximal end, a distal end and a flared section that tapers between said proximal end and said distal end, wherein (a) said proximal end has a first perimeter $P_1$, and said flared section has a second perimeter $P_2$ where $P_1<P_2$, (b) said body defines a first slot extending between said proximal end and said distal end and (c) said body defines a second slot and a third slot extending between said proximal end and said distal end.

10. The heat stake of claim 9, wherein said body includes a hollow core.

11. The heat stake of claim 10, wherein said distal end includes a dual taper having an inner lead-in and an outer lead-in.

12. The heat stake of claim 11, wherein said first slot, said second slot and said third slot are radially arrayed.

13. The heat stake of claim 12, wherein said body includes a first section extending between said first slot and said second slot, a second section extending between said second slot and said third slot and a third section extending between said third slot and said first slot.

14. The heat stake of claim 9, wherein said distal end includes a dual taper.

15. A plastic part including the heat stake of claim 9.

* * * * *